United States Patent [19]
Naderi et al.

[11] Patent Number: 6,034,355
[45] Date of Patent: Mar. 7, 2000

[54] MEAL DELIVERY SYSTEM

[75] Inventors: James Naderi; Thomas E. Wallace, both of Charlotte, N.C.

[73] Assignee: A la Cart, Inc., Charlotte, N.C.

[21] Appl. No.: 09/093,538

[22] Filed: Jun. 8, 1998

[51] Int. Cl.⁷ .................................................. F27D 11/00
[52] U.S. Cl. .............................. 219/387; 29/386; 99/480
[58] Field of Search .................................. 219/387, 385, 219/386, 381, 523, 541, 506, 518; 99/483

[56] References Cited

U.S. PATENT DOCUMENTS

| | | |
|---|---|---|
| 3,908,749 | 9/1975 | Williams ................................. 165/61 |
| 3,935,415 | 1/1976 | Moore .................................... 219/750 |
| 4,068,115 | 1/1978 | Mack et al. ............................. 219/386 |
| 4,093,041 | 6/1978 | Davis et al. ............................. 186/45 |
| 4,167,983 | 9/1979 | Seider et al. .......................... 190/19.1 |
| 4,235,282 | 11/1980 | de Filipps ............................... 165/61 |
| 4,346,756 | 8/1982 | Dodd et al. . |
| 4,584,466 | 4/1986 | de Mola .................................. 219/386 |
| 4,775,002 | 10/1988 | Iwamoto . |
| 4,936,377 | 6/1990 | DeVogel et al. . |
| 5,028,761 | 7/1991 | Oda et al. . |
| 5,069,273 | 12/1991 | O'Hearne . |
| 5,086,693 | 2/1992 | Tippmann et al. . |
| 5,159,973 | 11/1992 | Pennington et al. . |
| 5,182,438 | 1/1993 | Oakes et al. ........................... 219/386 |
| 5,201,364 | 4/1993 | Tippmann et al. . |
| 5,203,258 | 4/1993 | Tippmann et al. . |
| 5,243,171 | 9/1993 | Wood et al. . |
| 5,285,051 | 2/1994 | DeGrow et al. . |
| 5,393,960 | 2/1995 | Beizermann . |
| 5,396,046 | 3/1995 | Oelfke . |
| 5,403,997 | 4/1995 | Wimpee et al. . |
| 5,404,935 | 4/1995 | Liebermann . |
| 5,454,427 | 10/1995 | Westbrooks et al. . |
| 5,520,102 | 5/1996 | Monetti . |
| 5,628,241 | 5/1997 | Chavanaz et al. . |
| 5,655,595 | 8/1997 | Westbrooks, Jr. . |

*Primary Examiner*—Teresa Walberg
*Assistant Examiner*—Vinod D Patel
*Attorney, Agent, or Firm*—Kennedy Covington Lobdell & Hickman LLP

[57] ABSTRACT

A meal delivery system for conveniently preparing, storing, transporting, rethermalizing and serving large volumes of food at multiple sites includes a new food serving pan equipped with an integral heating element and a first electrical connector, and a portable frame for receiving and supporting the food serving pan, and includes an electrical power supply means and at least one second electrical connector adapted to mate with the first electrical connector for providing electrical power to the heating element and heating the food serving pan when it is placed on the portable frame. The meal delivery system includes a heat control means comprising a removeable lid with first and second indicators for the food serving pan and a sensor means in the frame for detecting the first and second indicators and selectively controlling application of the electrical power delivered to the food serving pan for controlling the level of heat applied to foods within the food pan. A first preferred embodiment includes a mobile food service cart having a plurality of interior stations for receiving a corresponding number of food pans within the food service cart, each station including one second electrical connector for mating with the first electrical connector of the food pan. A second preferred embodiment includes a chafing dish serving frame adapted to support a single food serving pan on a serving surface and includes one second electrical connector for mating with the first electrical connector.

39 Claims, 6 Drawing Sheets

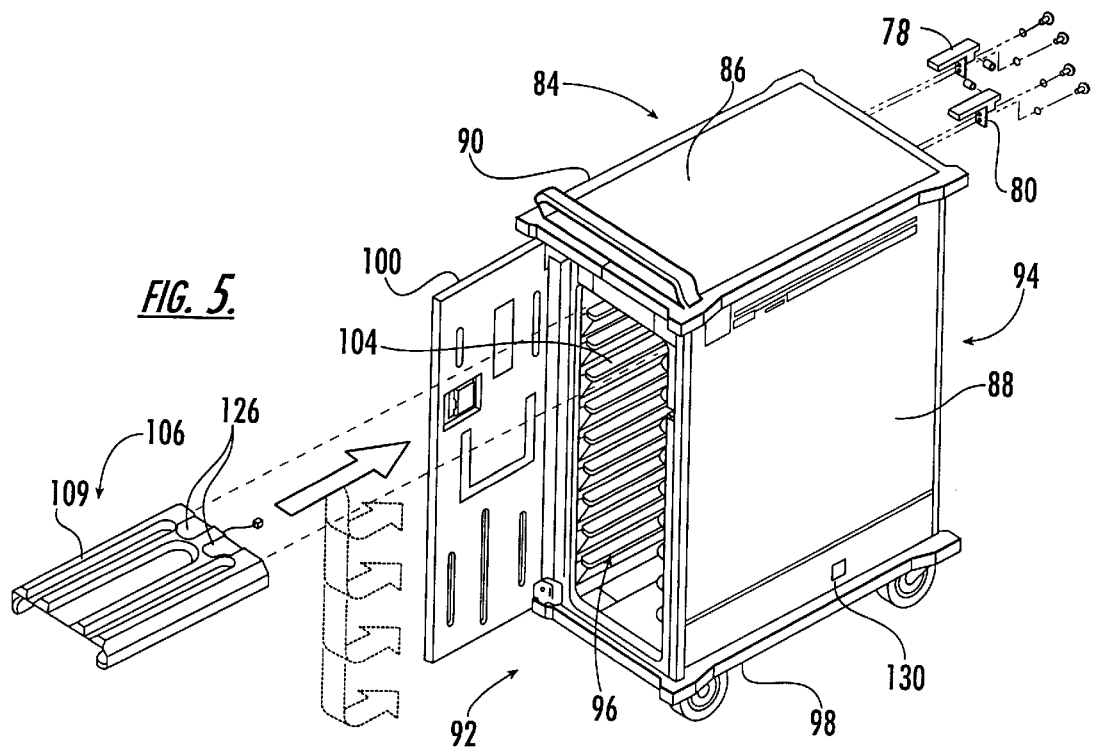
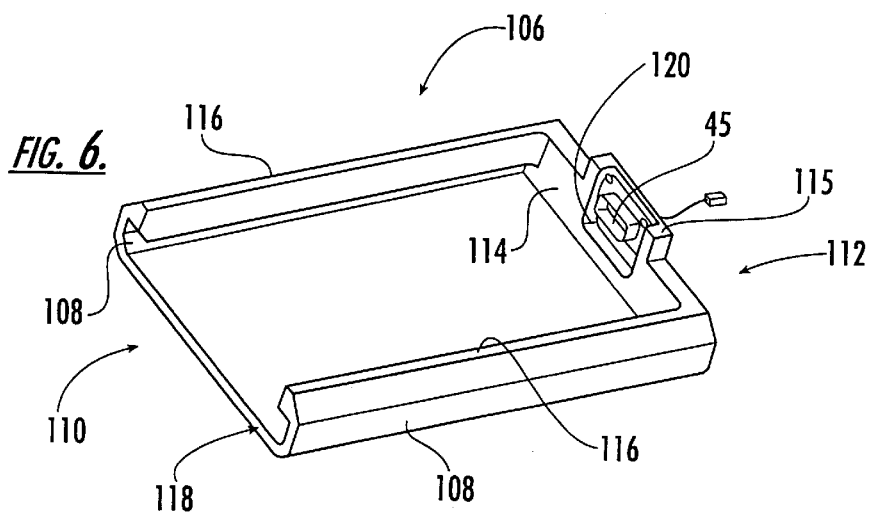

MEAL DELIVERY SYSTEM

BACKGROUND OF THE INVENTION

The present invention relates to food management systems and more particularly, relates to an improved meal delivery system for preparing, storing, transporting, rethermalizing and serving large volumes of food at multiple sites.

Food service management is a fast growing industry with high demands for efficiency, consistent quality and customer satisfaction. These issues are particularly important in areas of food service management in which foods are prepared and served in large quantities and in which foods prepared in one location must be delivered to another site at which the meals are served, such as in the healthcare industry and in the catering industry. In order for multiple warm meals to be delivered to a predetermined location at a particular time, the foods must be prepared, transported to the destination, unloaded and served. All of this must be accomplished within a pre-allotted amount of time while maintaining the foods at the desired temperature.

Typically, meals for high volume feeding, such as for a banquet or large catered event, are prepared in standard sized food service pans, kept hot for many minutes to a couple hours before the event, at which time they are plated or displayed and served hot. Movable warming or hot cabinets with vertically spaced apart shelves are known for storing meals prior to serving and for use as meal delivery and retrieval units. One disadvantage of these type of cabinets is that the meals therein may be maintained at the desired temperature for only a short time. Thus, if the transportation time is lengthy or the serving of the meals is delayed, the meals may not be suitably warm when served. Another disadvantage is though these carts are electrically powered, most operators do not trust them and, therefore, add sterno or hot water to the cart to supplement the warming effort.

Cabinets for meal storage, delivery and heat maintenance, which include heating components, are known. Examples of these types of cabinets are shown in U.S. Pat. Nos. 5,404,935, 5,628,241, 5,520,102, and 5,403,997. However, another disadvantage of these type of cabinets is that cart components are heated but the food pan itself is not directly heated. Also, these carts often require that the foods be transferred from the standard size food pan to another holder. In addition, the heated cabinet may improperly heat food by applying high levels of heat to foods which require low levels of heat or fail to heat the food sufficiently by applying low levels of heat to foods which require high levels of heat. Thus, certain foods may become undesirably dry under high levels of heat and other foods may not be sufficiently warmed under low levels of heat. Further, because the food pan itself is not directly heated, the foods must be removed from the heated environment and placed on a serving surface, such as a buffet table, for serving and may quickly become cold. While heated lamps or burners may help to keep the foods warm while being served, such lamps or burners may not be readily available or convenient to use in some settings and often do not keep the foods sufficiently and uniformly warm.

SUMMARY OF THE INVENTION

It is accordingly an object of the present invention to provide a meal delivery system for conveniently preparing, storing, transporting, rethermalizing and serving large volumes of food while satisfying the demand for increased efficiency, consistent quality and customer satisfaction.

It is another object to provide a new food serving pan or container having the dimensions of a standard size food service pan, such as used by hotels, banquet facilities and caterers, in which food may be initially prepared, chilled and stored until ready to serve, at which time the food may be rethemalized in and distributed from the same food pan.

It is another object to provide a mobile food service cart which carries a number of such new food serving pans for simply and safely holding, chilling, transporting and heating large volumes of food all in the same cart without requiring that the food be moved from one pan to another or requiring the use of a separate oven for rethermalizing the food.

It is another object to provide a stand-alone chafing dish serving frame which carries one of the new food serving pans and may be connected up to two additional serving frames and pans for placing the food pan on a surface, such as a banquet table or buffet counter, and conveniently serving the food directly from the food pan while continuing to apply heat directly to the food pan.

Briefly summarized, the foregoing objects are achieved in accordance with the present invention by a meal delivery system which comprises a new food serving pan or container having the dimensions of a standard size food service pan, such as used by hotels, banquet facilities, and caterers. The new food serving pan is equipped with an integral heating element and electrical connector for mating with a similar electrical connector in a portable frame. The portable frame of the present invention is adapted to receive and support the food serving pan and includes an electrical power source connected to the electrical connector for energizing the heating element of the food serving pan when the pan is placed on the frame and the electrical connectors of the frame in the serving pan are connected to each other. The new food serving pan may be fabricated from any suitable material, such as, by way of example, stainless steel, with the electrical heating element affixed therein. It is also contemplated that the new food serving pan may be molded from a high temperature, high impact plastic with the electrical heating element sealed within the food pan. This method seals the heating element inside the food pan, away from water and contaminants for an exceptionally safe and reliable means of heating. The heating element of the new food serving pan comprises at least one surface heater and a temperature regulator associated therewith, such as an integrated thermostat, to eliminate overheating. In the preferred embodiment, the heating element comprises three spaced apart surface heaters with thermostats affixed to the bottom of the food serving pan. The electrical connector of the food serving pan includes appropriate electrical wiring extending to each surface heater for connecting the surface heaters to the electrical power source when the electrical connectors of the food serving pan and the frame are mated.

The present invention also includes a heat control means for selecting the level of heat applied to the food within the new food serving pan or container. In the preferred embodiment, the heat control means comprises a removable lid which is fitted to the food pan and includes first and second indicators, and a sensor means in the frame which controls the level of heat applied to the food within the pan by detecting the first and second indicators and selectively controlling whether higher or lower application of electrical power is delivered to the food serving pan. In the preferred embodiment the first indicator is associated with a "High" application of electrical power for providing a relatively higher level of heat and the second indicator is associated with a "Low" application of heat for providing a relatively lower level of heat. The preferred first and second indicators are integrated magnets at opposite ends of the lid and offset towards one lengthwise side thereof. The magnets are detected by one of two detection devices, such as by way of example, reed switches, positioned within the frame to detect the proximity of one of the magnets when the food serving pan is received by the frame for selectively activating a central processor positioned within the frame which controls whether a higher or lower electrical power is delivered to the food serving pan depending upon which detection device detects the proximity of a magnet. The offset magnets in the removable lid for the food serving pan are uniquely designed to indicate different heating levels merely by reversing the orientation of the lid on the food serving pan. Thus, by selective positioning of the lid on the food serving pan, it is possible to control the level of heat energy applied to the food within the food serving pan.

In one embodiment of the present invention, the portable frame is a mobile food service cart having multiple food serving pan support ports or stations in which a corresponding number of new food serving pans or containers are carried. The food service cart has a space-saving compact and lightweight design for providing a cart that is easy to handle, durable and reliable. The food service cart includes a cart body comprising a top having a flat surface, opposite side walls, front and rear walls and a base defining an interior. The preferred embodiment includes rollers attached to the base. The front wall of the cart body comprises an openable front door for loading and unloading food pans into and from the cart and the rear wall comprises an openable rear door for loading and unloading food pans into and from the cart. In the preferred embodiment, the side walls and doors have a modular panelized design for easy, economical service and repairs and are comprised of fully insulated, replaceable panels constructed from an extremely high impact resistant material which provides a virtually dent-proof exterior. Non-marking bumpers preferably encircle both the top and the base frame of the food service cart. In addition, the preferred food service cart includes recessed door handles and hinges which allow the doors to swing 270 degrees and are held in the open position with magnets and includes heavy duty steel caster frames for moving the cart and a wide wheel track for added stability when turning the cart. In the preferred embodiment, the casters incorporate a "total lock" brake which locks both wheel and caster rotation simultaneously with a simple downward motion of a brake pedal. The wheel tires are a non-marking soft rubber and are specifically designed to roll easily over rough terrain as well as carpeting.

Within its interior, the mobile food service cart of the present invention includes an electrical power supply means or component for connecting the cart to an electrical power source, such as an electrical outlet, and multiple electrical connectors. One electrical connector is provided adjacent to each port or pan support station to mate, respectively, with the electrical connector of each food serving pan therein. When the electrical connectors of the food serving pans are mated with the electrical connectors of the stations within the cart, the cart delivers electrical energy to each food serving pan to rethermalize the food in preparation for service. Each port or station includes a station module having a food serving pan receiving area and one electrical connector disposed adjacent to the receiving area. Each station module is C-shaped in cross-section and includes opposing flanges for engaging the side walls of the food serving pan.

The stations are horizontally disposed in the interior of the cart in vertical alignment with one another and spaced to accommodate the food serving pan carried by each station. Prior to placement in the stations of the food service cart, each food serving pan is fitted with the lid which includes integrated magnets at opposite ends of the lid offset toward one lengthwise side thereof. The top surface of the lid includes visible indicia or markings at each end of the lid indicating either a higher or lower power setting. The cart also includes two reed switches, or other similar detection devices, disposed within each pan support port or station at opposite sides of the station to detect the proximity of one of the magnets of the lid of the food serving pan therein. One such lid is placed on each food serving pan so as to position the magnets along either the left hand or right hand side of the pan, whereby only one of the reed switches will detect the proximity of a magnet. In the preferred embodiment, the reed switches adjacent to each station are connected to a central processor within the cart which selectively controls whether higher or lower electrical energy is delivered to the associated serving pan depending upon which reed switch senses the proximity of a magnet.

In the preferred embodiment, the mobile food service cart also includes an interior wall dividing the interior of the cart into two compartments. The front compartment includes the multiple stations with electrical connectors for receiving the food serving pans as described herein. The rear compartment includes multiple shelves for storing cold foods. The cold food shelves are accessible through the rear door of the cart and are adapted to carry half size pans containing cold foods. The mobile food service cart embodiment of the present invention may further include a chilling cart docking station for chilling foods to be served chilled and maintaining the foods at the desired temperature. The chilling cart docking station is adapted to be connected to the rear wall of the food service cart after the cart has been loaded and the cart doors are closed. In use, the food service cart is pushed against the docking station until the door frame of the cart compresses against a mating gasket on the chilling cart docking station and the chilling cart is connected to the food service cart.

In another embodiment of the present invention, the portable frame is a stand-alone chafing dish serving frame adapted to support a single new food pan on a buffet table, counter or such other serving surface for conveniently serving the foods directly from the food pan while continuing to apply heat directly to the food pan. The serving frame basically comprises a tray having guard rails for preventing the food pan from inadvertent movement during serving of the food and one electrical connector for mating with the electrical connector on the food pan to provide electrical power to the food pan and energize the heating element. In the preferred embodiment, the serving frame includes a flat base, a front rail, opposite side guard rails and a back rail. The preferred front guard rail includes a rounded or curved top edge which is positioned adjacent to the end of the pan which does not include the electrical connector and a bottom edge which extends below the flat base and is aligned with the end of the table or counter on which the serving frame is placed. The back rail includes the electrical connector positioned to be mated with the electrical connector of the food serving pan and an electrical cord for connecting the electrical connector of the serving frame to an electrical power source, such as an electrical outlet. A maximum of three serving frames may be connected to a single power source with two of the serving frames connected to a third serving frame which includes the electrical cord for connecting all three of the serving frames to the power source. Once properly connected, the serving frame detects the pan presence and applies a low level power source for maintaining food temperatures.

Utilizing the present invention, foods may be initially prepared and loaded into the new food serving pan and then "blast" chilled for holding until ready to be served, at which time the pans are loaded into the mobile food service cart. The food service cart may be readily moved to any location such as a banquet or other catered event. Foods to be served hot are rethermalized by heating means within the cart. The lids are placed on the serving pans to actuate the desired power setting. The orientation of the lid fitted on each food serving pan determines for each individual station whether heat will be applied and maintained at a higher level or a lower level at that station. Foods to be served chilled are loaded into the cart through the rear door and are chilled and/or maintained at the desired temperature. When the hot foods are ready to be served, each serving pan may be removed from the food service cart and placed on the serving frame which continues to energize the heating element and apply heat to the individual food serving pan at a low power level.

Further details, features and advantages of the invention can be understood from the exemplary embodiments described in the following description with reference to the accompanying drawings.

BRIEF DESCRIPTION OF THE DRAWINGS

FIG. 5 is a perspective view of the mobile food service cart showing one of the station modules to be placed in the cart for receiving and supporting the food serving pans.

FIG. 6 is an inverted perspective view of the station module showing a second electrical connector which mates with the first electrical connector of the food serving pan when the food serving pans are received by the stations of the food cart.

DETAILED DESCRIPTION OF THE PREFERRED EMBODIMENTS

Figure 6A:
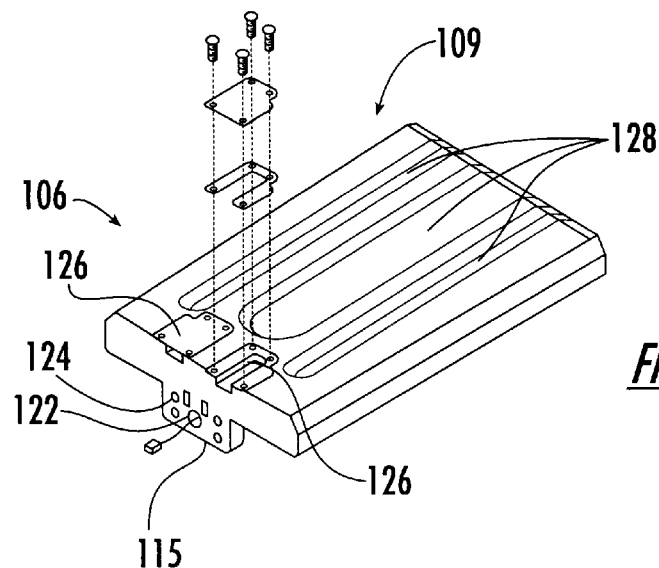
FIG. 6A is a perspective view of the station body showing two pockets for housing the reed switches.
Figure 7:
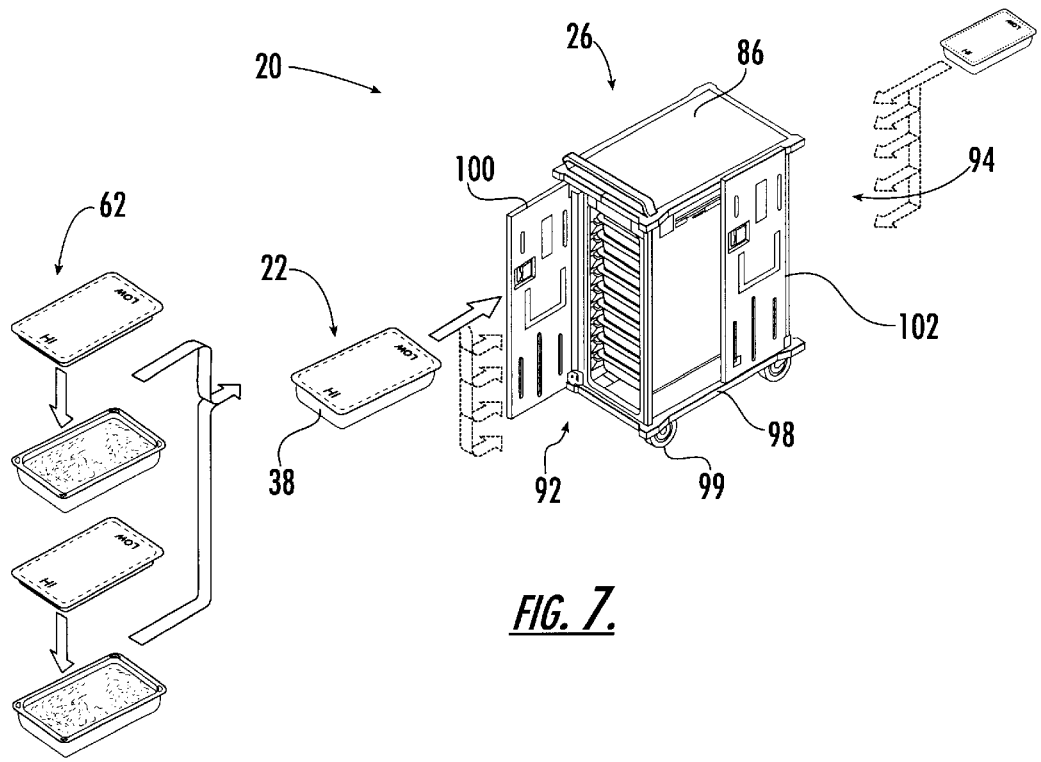
FIG. 7 is a perspective view of the mobile food service cart receiving a food serving pan with the lid positioned thereon to a High setting and the mobile food service cart including a rear compartment for receiving a plurality of half-size pans of cold food.
Figure 8:
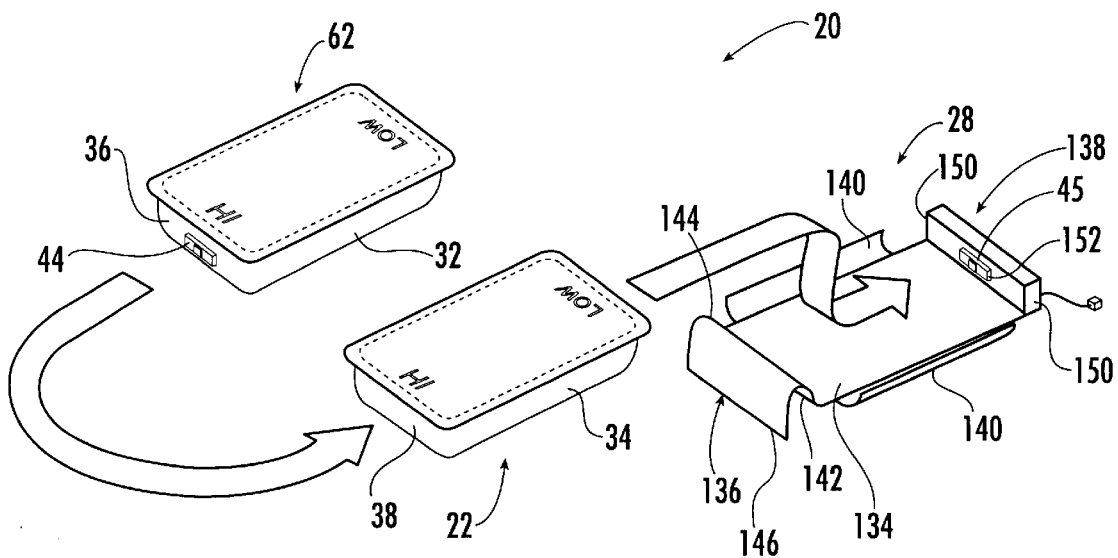
FIG. 8 is a perspective view of the serving frame and the new food serving pan being oriented for placement on and connection with the serving frame in accordance with another preferred embodiment of the invention.
Figure 9:
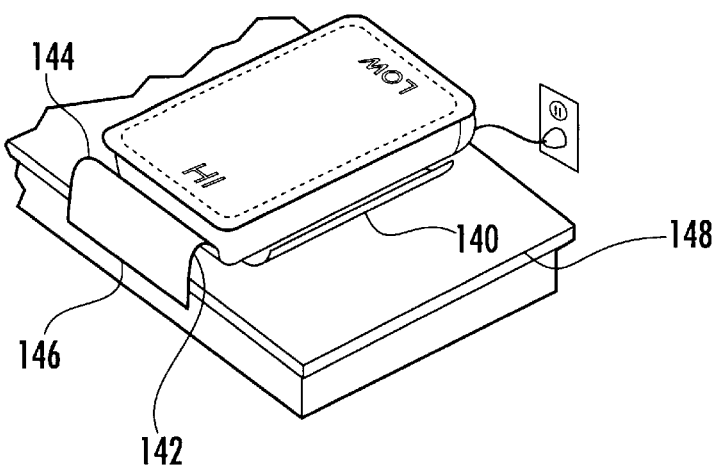
FIG. 9 is a perspective view of the new food serving pan on the serving frame.
Figure 10:
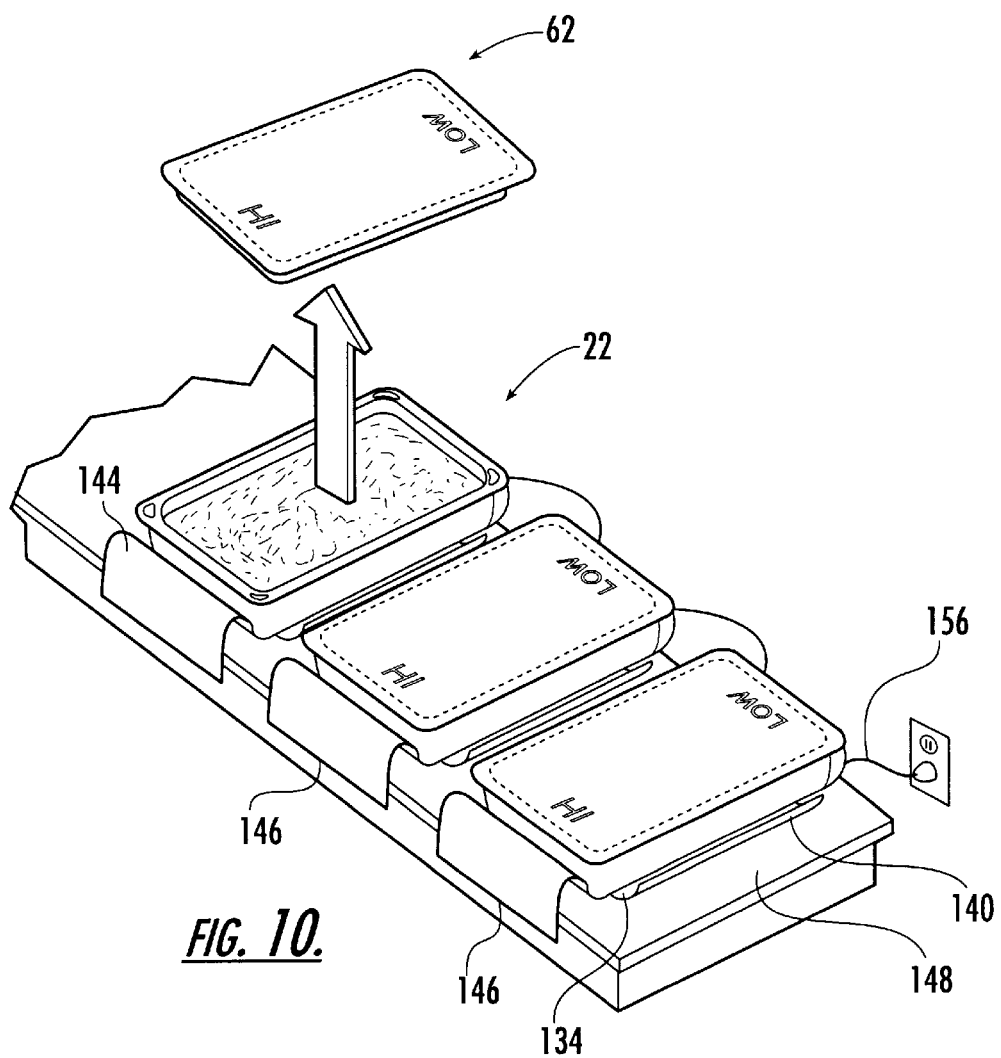
FIG. 10 is a perspective view of three serving frames in series plugged into one phase with the insulated lid removed from one of the pans for serving the food.

Turning now to the drawings, a meal delivery system according to the present invention is illustrated at 20 and basically includes a new food pan or container 22 and a portable frame adapted to receive and support the new food serving pan 22 for conveniently preparing, storing, transporting, rethermalizing and serving large amounts of food all in the same food serving pan 22. FIGS. 1 and 5–7 illustrate the first preferred embodiment in which a plurality of new food serving pans or containers 22 may be received and supported by a portable frame essentially in the form of mobile food service cart 26. FIGS. 8–10 illustrate the second preferred embodiment in which a single new food serving pan or container 22 is received and supported by a portable frame essentially in the form of a serving frame 28.

Figure 2:
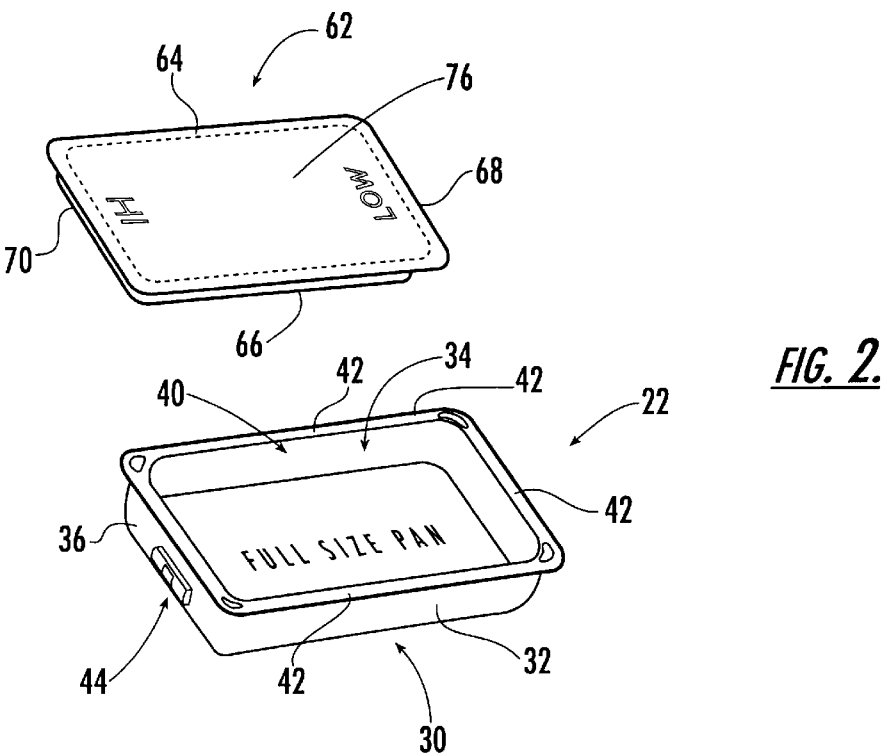
FIG. 2 is a perspective view of a new food serving pan having the dimensions of a full size pan and including a first electrical connector and a lid which fits the food serving pan and controls level of heat energy applied to the food.
Figure 3:
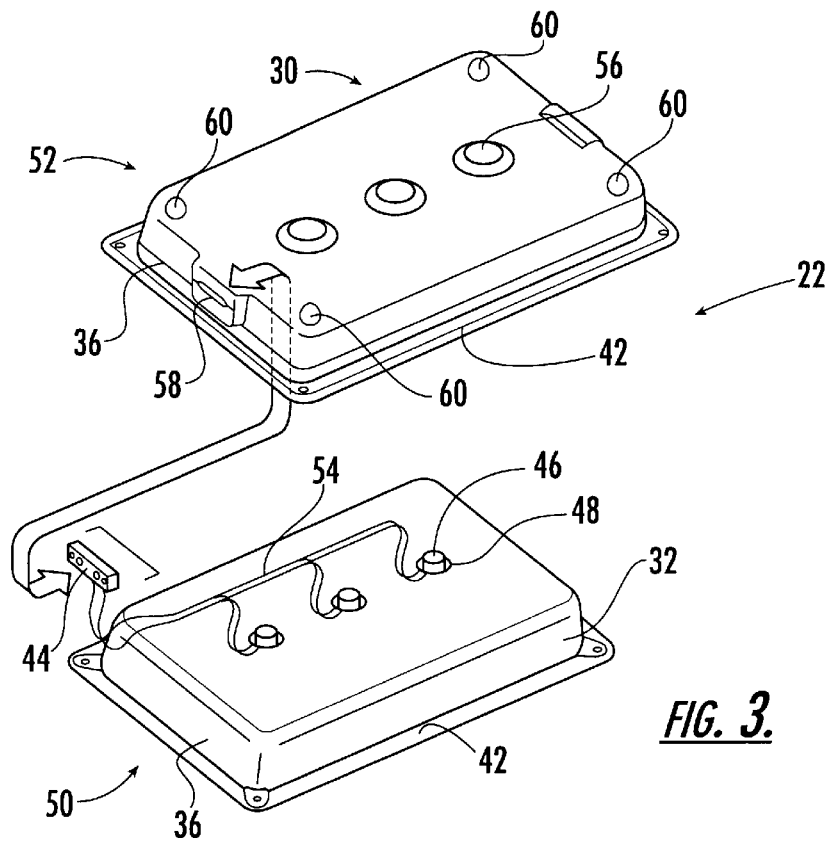
FIG. 3 is an inverted, exploded view of the new food serving pan showing three surface heaters connected to the first electrical connector and the raised portions on the bottom of the pan enclosing the surface heaters.
Figure 4:
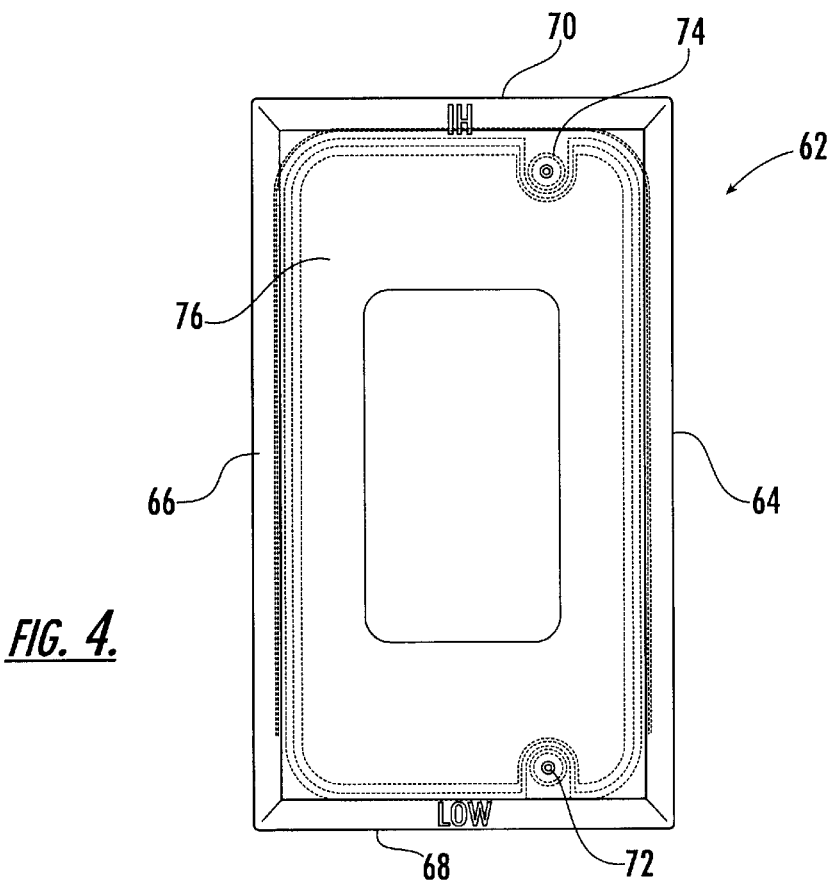
FIG. 4 is a top view of the lid showing the position of the integrated magnets and the Hi and Low indicia on the top of the lid.

Referring now specifically to FIGS. 2–4, the new food serving pan 22 of the preferred embodiments has a substantially rectangular shape and includes a bottom 30, opposite side walls 32, 34, end walls 36, 38 and an open top 40. As shown in FIGS. 2–4, each opposite side wall 32, 34 of the food serving pan 22 has an outwardly projecting top rim portion 42 extending outward from the side walls 32, 34. As illustrated in FIGS. 2 and 3, the new food serving pan 22 includes a first electrical connector 44 in the end wall 36, which is adapted to mate with a second electrical connector 45 in the portable frame. The new food serving pan 22 is equipped with an integral heating element which includes at least one surface heater 46 incorporating a temperature regulator, such as an integrated thermostat 48. As depicted in FIG. 3, the heating element of the preferred embodiment comprises three spaced apart surface heaters 46 which are positioned within an inner surface layer 50 which nests within an outer surface layer 52 in the bottom 30 of the food serving pan 22. The first electrical connector 44 includes appropriate electrical wiring, such as electrical wire or cord 54 which extends between the layers 50, 52 from the first electrical connector 44 to each surface heater 46 and associated thermostat 48 for connecting the heaters to an electrical power supply means. The outer layer 52 includes at least one raised portion 56 which houses the surface heater 46 and its associated thermostat 48 and includes an opening 58 in the end wall 36 which carries and provides access to the first electrical connector 44 positioned therein (see FIG. 3). The outer layer 52 also includes additional raised portions or feet 60 for supporting the bottom 30 so that the food serving pan 22 is level when placed on a flat surface. In the preferred embodiment, the food serving pan 22 is fabricated from a suitable material, such as by way of example, stainless steel and includes the electrical heating element sealed within the bottom 30 of the serving pan 22. This method seals the surface heaters 46 and associated thermostats 48 inside the food serving pan 22, away from water and contaminants, for an exceptionally safe and reliable means of heating.

The new food serving pan 22 of the present invention also includes a heat control means which includes a removable, insulated lid cover or lid 62 having opposite sides 64, 66, opposite ends 68, 70, and a top surface 76. The removable lid 62 covers the open top 40 of the food serving pan 22 and is sized to fit snugly on the serving pan 22. The lid 62 includes a first indicator 72 at one end 68 of the lid near one lengthwise side 64 of the lid and a second indicator 74 at the opposite end 70 of the lid along the same lengthwise side 64 as the first indicator 72. In the preferred embodiments of the present invention, the first and second indicators 72, 74 are integrated magnets. As illustrated in FIG. 4, the first indicator 72 is associated with a higher application of electrical power for providing a relatively higher level of heat and the second indicator 74 is associated with a lower application of electrical power for providing a relatively lower level of heat. As shown, the top surface 76 of the lid 62 includes a visible indicia or marking HI on the end 70 opposite from the indicator 72 and a visible indicia or marking LOW on the end 68 opposite from the indicator 74 so that the desired power setting is facing the operator when the food serving pan 22 is positioned on the frame. Thus, the HI marking is at the end 70 opposite from the first indicator 72 and the LOW marking is at the other end 68 opposite from the second indicator 74.

The heat control means of the present invention also includes a sensor means in the portable frame which determines the level of heat applied to the food within the food serving pan 22 by detecting the first and second indicator 72, 74 of the lid 62 and selectively controlling whether a higher or lower application of electrical power is delivered to the food serving pan 22. In the preferred embodiments, the sensor means includes two detection devices 78, 80, such as reed switches, connected to a central processor, which selectively controls whether higher or lower electrical power is delivered to the food serving pan 22. The detection devices 78, 80 are positioned within the frame so that one detection device is adjacent to one end of the food serving pan 22 and detects the proximity of one of the indicators 72, 74 when the food serving pan is placed on the frame depending on the placement of the lid 62 on the food serving pan 22. One detection device 78 is located near one side wall 32 of the food serving pan 22 for activating the central processor to deliver higher electrical power to the food serving pan 22 and the other detection device 80 is located near the opposite side wall 34 of the food serving pan for activating the central processor to deliver lower electrical power to the food serving pan 22.

In use, when the lid 62 is placed on the food serving pan 22 to position the first indicator 72 at the end of the food serving pan including the first electrical connector so that the first indicator is adjacent to one of the detection devices when the food serving pan is placed on the frame, the detection device that is adjacent to the first indicator is adapted to activate the central processor to deliver higher electrical power to the heating element of the food serving pan 22. If the lid 62 is re-oriented on the food serving pan 22 to position the second indicator 74 at the end of the food serving pan including the first electrical connector, the second indicator 74 is adjacent to the other detection device which is adapted to activate the central processor to deliver lower electrical power to the heating element of the food serving pan 22.

Referring now to FIGS. 1 and 5–7, the mobile food service cart 26 of the first embodiment is designed to receive and support a plurality of new food serving pans 22 for transporting, heating and holding large volumes of food all in the same cart. The food service cart 26 comprises a cart body 84 including a top 86 having a flat top surface, opposite side walls 88, 90, front and rear walls 92, 94, and a base 98 defining an interior 96. In the preferred embodiment, rollers 99 are attached to the base 98. The preferred top 86 and the base 98 are constructed from a heavy gauge stainless steel and provide a stainless steel work surface top and a base frame with a truck-like strength which allows several food service carts to be towed in train. The front wall 92 of the cart body comprises an openable front door 100 for loading and unloading food serving pans 22 into and from the cart 26 and the rear wall 94 comprises an openable rear door 102 for loading and unloading food serving pans 22 into and from the cart 26. In the preferred embodiment, the cart 26 is designed to carry nine food serving pans 22. The side walls 88, 90 and doors 100, 102 are fully insulated, replaceable panels constructed from an extremely high impact resistant material which provides a virtually dent-proof exterior. The preferred embodiment also includes an interior wall 97 within the interior 96 of the cart which divides the interior into a front compartment accessible through the front door 100 and a rear compartment accessible through the rear door 102. The interior wall 97 includes a post 99 which supports said interior wall 97. The rear compartment includes multiple shelves for holding food pans, preferably half-size food pans, containing cold foods.

Figure 1:
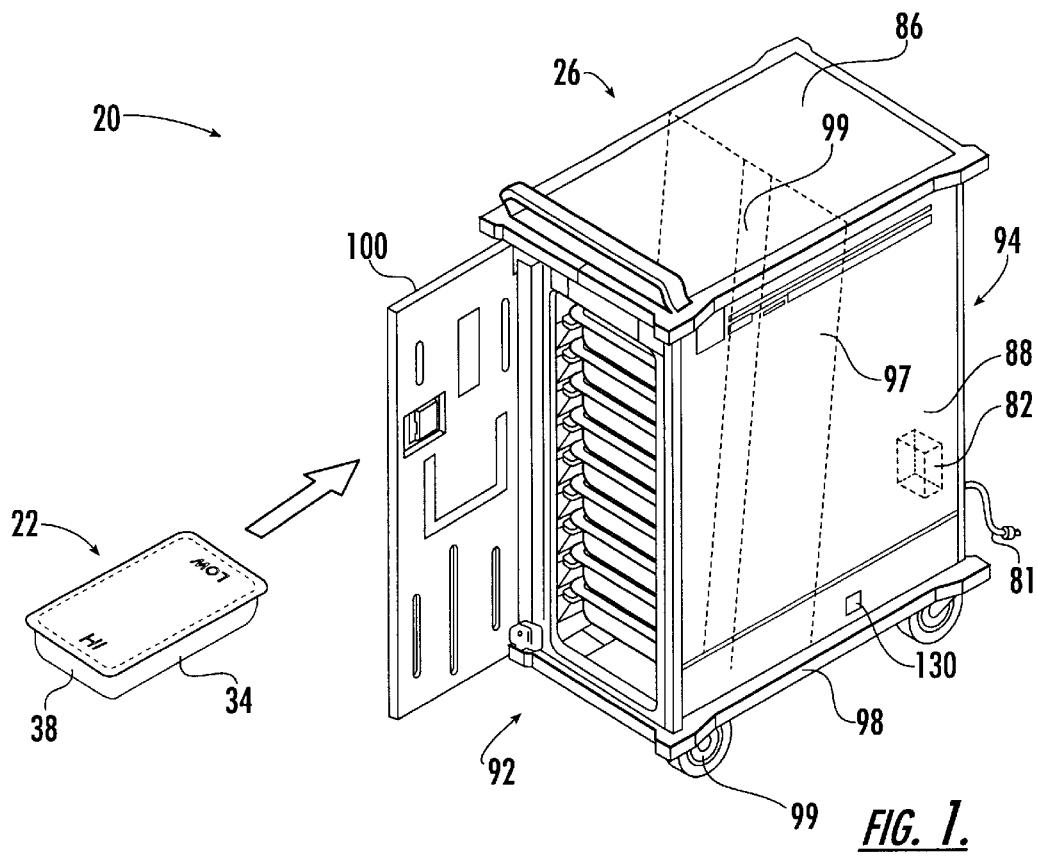
FIG. 1 is a perspective view of a mobile food service cart for receiving and supporting numerous new food serving pans and depicting a new food serving pan covered by a lid being received into the food service cart in accordance with one preferred embodiment of the invention.

As shown in FIG. 1, a plurality of pan support ports or stations 104 for receiving and supporting a corresponding number of food serving pans 22 are included in the interior 96 of the food cart 26. The stations 104 are horizontally disposed in spaced vertical alignment with one another a predetermined distance apart to accommodate the food serving pans 22 carried by each station 104. One second electrical connector 45 is provided adjacent to each port or station 104 to mate, respectively, with the first electrical connector 44 of each food serving pan 22 carried therein. As best seen in FIGS. 5 and 6, each port or station 104 includes a station module 106 having opposite sides 108, a top surface 109, a front end 110 and a back end 112 including a back wall 114. The station body 106 is mounted in the interior 96 of the cart 26 and includes a food serving pan receiving area and an electrical connector receiving portion on the station body 106. Each station module 106 includes opposing U-shaped sides or flanges 116 which extend downward from the station module 106 for engaging the side walls of the food serving pan 22. Each flange 116 forms an elongated channel 118 which receives the top rim portion 42 of the food serving pan 22 and guides the food serving pan into each station 104 of the cart 26. The back wall 114 extends traversely between the flanges 116 and supports one second electrical connector 45. As illustrated in FIG. 6, the back wall 114 of the station module 106 includes an extended portion 115 housing the electrical connector receiving portion which is a cut-away section 120. In the preferred embodiment, the cut-away section 120 is a rectangular shaped opening with a through hole 122 in which the second electrical connector 45 of each station 104 is positioned for mating with the first electrical connector 44. The extended portion 115 of the back wall also includes at least one other through hole 124 for mounting the station module 106 to post 99 in the interior 96 of the cart with fasteners, such as screws.

Figure 6B:
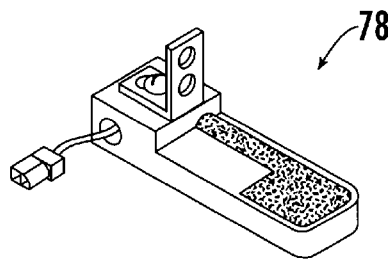
FIG. 6B is an enlarged perspective view of one of the reed switches.

The station module 106 also includes two pockets or slots 126 for housing the detection devices 78, 80 which are illustrated in FIG. 6B. As best seen in FIGS. 5 and 6A, the pockets 126 are located in the top surface 109 near the back end 112 of the station module 106 in a spaced apart position. The detection devices 78, 80 are connected to a central processor 82 which selectively controls whether higher or lower application of electrical power is delivered to each food serving pan 22. As shown in FIG. 1, an electrical cord 81 is provided for connecting the cart 26 to an electrical power supply via an outlet. As shown in FIG. 6A, the top surface 109 of the station module 106 forms a shelf for the food serving pan 22 carried in the station above for providing additional support to the food serving pan 22 and includes three elongated grooves or recessed portions 128 for receiving raised portion 56 and feet 60 of the bottom 30 of the food serving pan 22 when the station module 106 is received by the cart 26. As shown in FIG. 3, the preferred embodiment includes three surface heaters 46 under three raised portions 56 aligned on the bottom 30 of the food serving pan 22 and two feet 60 positioned on each side and at each end of the food serving pan so that one of the recessed portions 128 accommodates the raised portions 56 and two of the recessed portions 128 accommodate the feet 60.

Figure 7A:
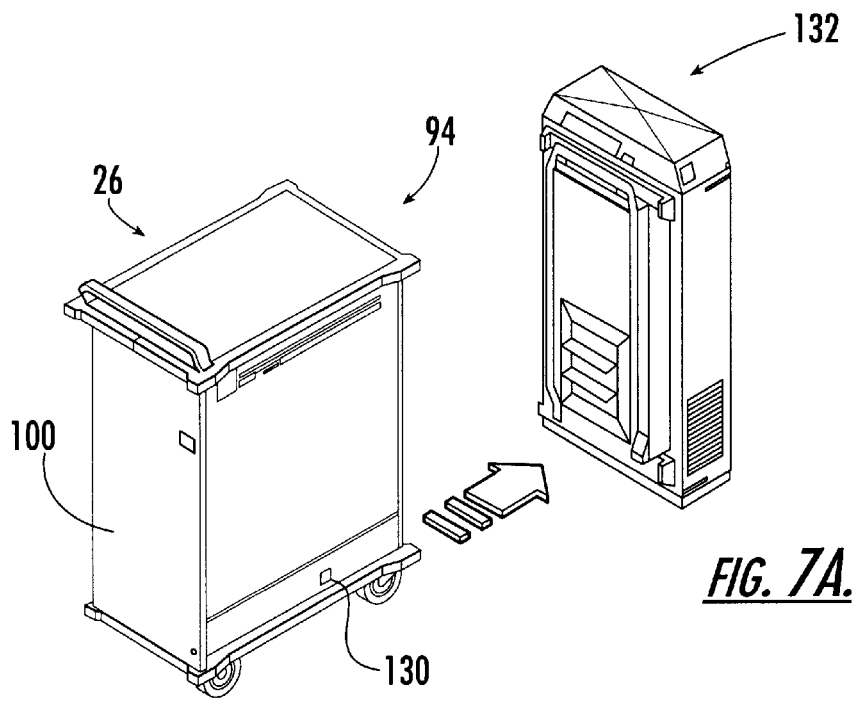
FIG. 7A is a perspective view of the mobile food service cart including a chilling cart docking station to be connected to the rear wall of the mobile food service cart.

In use, for example, for a catered event, the caterer prepares and loads cooked foods needed for the event into a number of the new food serving pans 22 in advance of the event. The foods within the loaded serving pans 22 are then chilled and sent to chill storage until shortly before the event. As illustrated in FIG. 7, when the caterer is ready to reheat the food, the lid is positioned on the serving pan 22 so that the desired rethermalizing higher or lower power setting is facing the operator when the serving pans 22 are loaded through the open front door 100 into the cart 26. The serving pans 22 must be loaded into each station 104 with the end 36 including the first electrical connector 44 facing the cart 26 so that the first electrical connector 44 is mated with the second electrical connector 45 of each station 104 when the food serving pan 22 is in the station 104. Thus, the operator selects for each individual food serving pan 22 whether the foods therein will be heated at a higher power setting or a lower power setting depending on the orientation of the lid 62. The front and rear doors 100, 102 include hinges which allow the doors to be swung 270° and held in an open position by magnets 130 located on the side walls 88, 90 of the cart 26 while the cart is being loaded. In FIG. 7, the rear door 102 is shown in the open position while cold foods carried in half size pans are being loaded into the cart 26. After the rethermalizing higher and lower settings are rechecked, the front and rear doors 100, 102 are closed and the food serving pans which were loaded through the front end of the cart are rethermalized to provide and maintain hot foods at a desired temperature. In a variation of the first embodiment shown in FIG. 7A, a chilling cart docking station 132 is provided and the rear wall 94 of the cart 26 is connected to the chilling cart docking station for chilling foods to be served chilled and maintaining the foods at the desired temperature.

Referring now to FIGS. 8–10, the second preferred embodiment is directed to a chafing dish serving frame 28 adapted to receive and support a single food serving pan 22 for serving food directly from the serving pan while continuing to maintain the food at the desired temperature. As shown in FIGS. 8–10, the serving frame 28 is designed to be used with the new food serving pan 22 and lid 62, on a low power setting. The serving frame 28 includes a base 134, a front rail 136, back rail 138 and side rails 140. As shown in FIG. 8, the front rail 136 comprises a front wall 142 extending vertically from the base 134 and includes a curved or rounded top portion 144 and a bottom edge 146 which extends below the base 134. When the serving frame 28 is placed on a counter 148 or other serving surface, the bottom edge 146 extends downward to engage the edge of the counter 148 as illustrated in FIGS. 9 and 10. The back rail 138 is a substantially rectangular block having opposite ends 150 and includes a cut-away section 152. In the preferred embodiment, the cut-away section 152 is a substantially rectangular shaped opening for accommodating the second electrical connector 45 in a position for mating with the first electrical connector 44 when the food serving pan 22 is placed on the serving frame 28. The back rail 138 includes an electrical cord 156 for connecting the serving frame 28 to an electrical power supply via an electrical supply outlet. In use, after rethermalizing in the cart 26, the serving frame 28 is positioned on a counter or buffet table or other surface, and the loaded food serving pan 22 is removed from the cart 26 and positioned on the serving frame 28 so that the first electrical connector 44 is mated with the second electrical connector 45. A low power setting is automatically selected to maintain the food serving pan 22 at a desired temperature. The insulated lid 62 is removed and the food is served directly from the food serving pan 22. As illustrated in FIG. 10, a maximum of three serving frames 28 may be connected to each other in series and plugged into a single electrical supply outlet.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A meal delivery system for heating and storing of food contained within a serving pan, comprising:

a pan having walls and a bottom together defining an open food containment area for receipt of food therein, said pan further including integral therewith a first electrical connector disposed on one of said walls and a plurality of heating elements disposed in said bottom for heating of food within said containment area through conduction, each said heating element including its own temperature regulator; and a portable frame adapted to receive said pan for support thereof, said frame having a second electrical connector adapted to mate with said first electrical connector when said pan is received within said frame for providing electrical power to said plurality of heating elements.

2. The meal delivery system of claim 1, wherein said portable frame comprises a food service cart.

3. The meal delivery system of claim 1, wherein said portable frame comprises a serving platform.

4. The meal delivery system of claim 1, wherein each said heating element comprises a surface heater.

5. The meal delivery system of claim 1, wherein each said temperature regulator comprises a thermostat.

6. The meal delivery system of claim 1, wherein said plurality of heating elements are electrically connected in series to said first electrical connector.

7. The meal delivery system of claim 1, wherein said pan includes four feet that protrude from said bottom thereof for supporting said pan at an elevation above a support surface.

8. The meal delivery system of claim 1, wherein said pan comprises an inner pan-shaped member nested within an outer pan-shaped member, said plurality of heating elements being disposed between said inner and outer members.

9. The meal delivery system of claim 8, wherein said inner member is sealed to said outer member for complete enclosure of said plurality of heating elements within said pan.

10. A meal delivery system for heating, storing, transporting and serving of food contained within a serving pan, comprising:
- a pan including integral therewith a first electrical connector and a heating element connected thereto for heating of food within said pan through conduction;
- a food service cart adapted to receive said pan for support thereof during storage and transportation, said food service cart including a second electrical connector adapted to mate with said first electrical connector when said pan is received therein for providing electrical power to said heating element for heating of food contained within said pan; and
- a serving platform adapted to receive said pan for support thereon during serving of the food contained with said pan, said serving platform including a third electrical connector adapted to mate with said first electrical connector when said pan is received thereon for providing electrical power to said heating element for continued heating of food contained within said pan.

11. A method for the heating, storing, transporting, and serving of food contained within a serving pan, comprising the steps of:
- storing and transporting food within a pan supported within a food service cart while heating the food within the pan, the pan including integral therewith a first electrical connector and a heating element for heating of the food within the pan through conduction, the food service cart including a second electrical connector mated with the first electrical connector when the pan is received therein for providing electrical power to the heating element;
- transferring the pan from the food service cart onto a serving platform; and
- serving food from the pan supported on the serving platform located on a support surface while heating the food, the serving platform including a third electrical connector mated with the first electrical connector when the pan is supported thereon for providing electrical power to the heating element.

12. A meal delivery system for heating, storing, and transporting of food contained within a serving pan, comprising:
- a pan including integral therewith a first electrical connector and a heating element connected thereto for heating of food within said pan through conduction;
- a lid adapted to fit over said pan in covering relation thereto only in two different orientations, said lid including an indicator located thereon such that said indicator is disposed relative to said pan in a first location when said lid is in a first one of said two orientations, and such that said indicator is disposed relative to said pan in a second, different location when said lid is in a second one of said two orientations; and
- a food service cart adapted to receive said pan for support thereof during storage and transportation, said food service cart including a second electrical connector adapted to mate with said first electrical connector when said pan is received therein for providing electrical power to said heating element for heating of food contained within said pan, and further including a sensor disposed thereon such that said sensor only detects said indicator when in said first location.

13. The meal delivery system of claim 1, wherein said lid includes indicia which indicates the level of heating of said pan for each of said two different orientations of said lid relative to said pan.

14. The meal delivery system of claim 13, further including a processor disposed on said food service cart which controls the level of heating as a function of the detection by said sensor of said indicator in said first location.

15. A meal delivery system for heating, storing, and transporting of food contained within a serving pan, comprising:
- a pan including integral therewith a first electrical connector and a heating element connected thereto for heating of food within said pan through conduction;
- a lid adapted to fit over said pan in covering relation thereto in two different orientations, said lid including first and second indicators located thereon such that each indicator is disposed relative to said pan in a first location when said lid is in a first one of the two different orientations, and such that each indicator is disposed relative to said pan in a second, different location when said lid is in a second one of the two different orientations; and
- a food service cart adapted to receive said pan for support thereof during storage and transportation, said food service cart including a second electrical connector adapted to mate with said first electrical connector when said pan is received therein for providing electrical power to said heating element for heating of food within said pan, and further including two sensors disposed thereon such that a first said sensor detects said first indicator only when in said first location, and a said second sensor detects said second indicator only when in said second location.

16. The meal delivery system of claim 15, wherein each said indicator comprises a magnet and each said sensor comprises a reed switch.

17. The meal delivery system of claim 15, further including a processor disposed on said food service cart which controls the level of heating by said heating element as a function of which of said two sensors detects a respective said indicator.

18. The meal delivery system of claim 15, wherein said lid includes indicia which indicates the level of heating of said pan for each of said different orientations of said lid.

19. A method for heating at one of two different heating levels food contained within a serving pan during storing and transporting thereof in a food service cart, the pan including integral therewith a first electrical connector and a heating element connected thereto, the method comprising the steps of:
- covering the pan with a lid in one of two different orientations, the lid including an indicator located thereon such that the indicator is disposed relative to the pan in a first location when the lid is in a first one of the two different orientations, and the indicator is disposed relative to the pan in a second, different location when the lid is in a second one of the two different locations;
- placing the pan within a food service cart at a pan support location, the food service cart including a second electrical connector adapted to mate with the first electrical connector when the pan is received therein for providing electrical power to the heating element of the pan;

detecting with a sensor disposed on the food service cart the presence of the indicator in the first one of the two different locations when the pan is received within the food service cart; and supplying a first electrical current through the first and second electrical connectors to the heating element for heating of the food if the indicator is detected in the first one of the two different locations, and supplying a second, different electrical current through the first and second electrical connectors to the heating element for heating of the food if the indicator is not detected in the first one of the two different locations.

20. A method for heating at one of two different heating levels food contained within a serving pan during storing and transporting thereof in a food service cart, the pan including integral therewith a first electrical connector and a heating element connected thereto, the method comprising the steps of:

covering the pan with a lid in one of two different orientations, the lid including first and second indicators located thereon such that each indicator is disposed relative to the pan in a first location when the lid is in a first one of the two different orientations, and each indicator is disposed relative to the pan in a second, different location when the lid is in a second one of the two different locations;

placing the pan within a food service cart at a pan support location, the food service cart including a second electrical connector adapted to mate with the first electrical connector when the pan is received therein for providing electrical power to the heating element of the pan;

detecting with a sensor disposed on the food service cart the presence of the first indicator only in the first one of the respective two different locations;

detecting with a sensor disposed on the food service cart the presence of the second indicator only in the second one of the respective two different locations; and supplying a first electrical current through the first and second electrical connectors to the heating element for heating of the food at a first heating level if the first indicator is detected in the first one of the respective two different locations, and supplying a second, different electrical current through the first and second electrical connectors to the heating element for heating of the food at a second heating level if the second indicator is detected in the second one of the respective two different locations.

21. The method of claim 20, wherein the lid is rectangular, the first indicator is located on the lid at one end thereof, the second indicator is located on the lid at the opposite end, and each indicator is offset from a longitudinal axis of the lid to the same side thereof.

22. The method of claim 20, wherein the first and second indicators each comprise a magnet.

23. The method of claim 20, wherein each sensor comprises a reed switch.

24. The method of claim 20, wherein the lid includes indicia thereon that identifies the heating level at which the food will be heated when the lid is disposed in an orientation thereof on the pan.

25. A meal delivery system for heating, storing and transporting of food contained within a serving pan, comprising:

a pan including integral therewith a first electrical connector and a heating element connected thereto for heating of food within said pan through conduction; and a food service cart including a cart chassis and a molded station module mounted thereon having an inverted C-shaped cross-section adapted to slidably receive said pan therein for support thereof during storage and transportation, said station module including a second electrical connector attached thereto and adapted to mate with said first electrical connector when said pan is received therein for providing electrical power to said heating element for heating of food contained within said pan.

26. The meal delivery system of claim 25, wherein said station module is detachably mounted on said cart body.

27. The meal delivery system of claim 25, further including screws for mounting of said station module on said cart chassis.

28. The meal delivery system of claim 25, wherein said station module includes U-shaped sides that slidably engage a rim of said pan for support thereof.

29. The meal delivery system of claim 25, wherein said station module further includes a back wall to which said second electrical connector is mounted.

30. The meal delivery system of claim 28, wherein said back wall further includes an opening through which a fastener extends for mounting of said station module on said cart chassis.

31. The meal delivery system of claim 25, further comprising a plurality of pans and a corresponding plurality of station modules mounted on said food service cart in a vertically stacked configuration.

32. The meal delivery system of claim 31, wherein a bottom of a said pan received within a first said station module includes a downward protruding portion, and a second said station module mounted immediately below said first station module includes a top surface defining a shelf that engages and supports said bottom of said pan.

33. The meal delivery system of claim 32, wherein said top surface of said second station module includes a recess through which is received said downward protruding portion of said pan.

34. A meal delivery system for heating, storing and serving food, comprising:

a serving pan including integral therewith a first electrical connector and a heating element connected thereto for heating of food contained within said pan through conduction; and a first serving platform adapted to receive said pan thereon for support thereof on a serving surface during serving of the food from within said pan, said serving platform including a second electrical connector attached thereto and adapted to mate with said first electrical connector when said pan is supported on said platform for providing electrical power to said heating element for the heating of the food.

35. The meal delivery system of claim 34, wherein said back rail comprises a substantially rectangular block having a cut away section for accommodating said second electrical connector mounted therein.

36. The meal delivery system of claim 34, wherein said serving platform is connected to a power source and further comprising two additional serving platforms electrically connected in series with said first serving platform.

37. The meal delivery system of claim 34, wherein said serving platform comprises a base, a front rail, a back rail, and side rails defining a receiving area for said pan, said back rail including said second electrical connector mounted thereon.

38. The meal delivery system of claim 35, said serving platform further including a front lip extending downwardly from said front rail, said front lip including a bottom edge extending below said base to an extent for engaging a side edge of the serving surface.

39. A serving pan for use in a meal delivery system for heating and storing of food, the system including a portable frame adapted to receive the pan for support thereof, said pan comprising:

walls and a bottom together defining a single, open-ended food containment area;

a first electrical connector disposed on one of said walls; and a plurality of heating elements disposed in engagement with said pan bottom for heating of food within said containment area through conduction, each said heating element including its own temperature regulator, wherein said first electrical connector is adapted to mate with a second electrical connector disposed on the portable frame for providing electrical power to said plurality of heating elements.

* * * * *